United States Patent
Eluard

[15] 3,680,288
[45] Aug. 1, 1972

[54] PROCESS FOR REGENERATING ADSORPTION MASSES

[72] Inventor: Robert Eluard, Paris, France

[73] Assignee: L'Air Liquide Societe Anonyme pour L'Etude et L'Exploitation des Procedes Georges Claude, Paris, France

[22] Filed: April 6, 1970

[21] Appl. No.: 25,743

[30] Foreign Application Priority Data

May 7, 1969 France.........................6914638

[52] U.S. Cl............................................55/58, 55/62
[51] Int. Cl.........................B01d 51/06, B01d 53/00
[58] Field of Search..............................55/33, 58, 62

[56] References Cited

UNITED STATES PATENTS

| | | |
|---|---|---|
| 3,370,002 | 2/1968 | Cottle.......................260/708 X |
| 3,279,153 | 10/1966 | Basmadiian et al...............55/58 |
| 3,242,645 | 3/1966 | Montgareuil et al..............55/58 |
| 3,155,468 | 11/1964 | Montgareuil et al..........55/58 X |
| 2,944,627 | 7/1960 | Skarstrom.........................55/33 |
| 3,313,091 | 4/1967 | Berlin..............................55/58 |

Primary Examiner—Reuben Friedman
Assistant Examiner—R. W. Burks
Attorney—Young & Thompson

[57] ABSTRACT

A process for regenerating an adsorbent mass contained in an adsorption column and used for the isothermic separation of at least two gaseous constituents by a succession of adsorption and desorption operations, in which the regeneration of the mass is effected by desorption of at least one of the most adsorbable gaseous constituents, this desorption being effected by a fall in pressure and elution under constant pressure, and an elution with simultaneous raising of the pressure without withdrawal of the eluant gas precedes the said elution under constant pressure and succeeds the said fall in pressure.

3 Claims, 1 Drawing Figure

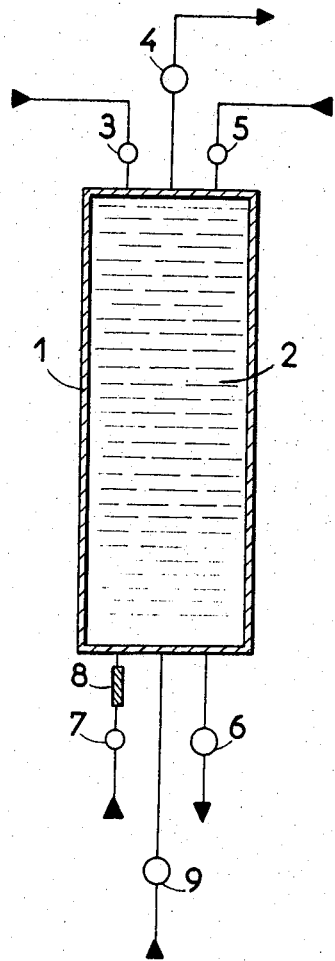

PROCESS FOR REGENERATING ADSORPTION MASSES

The present invention relates to an improved process for regenerating adsorption masses for the separation of gases.

It is in fact known to separate gases by means of adsorption masses which have the property of retaining certain gases in a preferential manner. Each adsorption phase, the consequence of which is to enrich the mixture with one or more of its constituents and to pollute the adsorption mass with the retained constituent or constituents, has to be followed by a regeneration or desorption phase, during which the retained constituent or constituents have to be extracted from the adsorption mass. This regeneration or desorption phase can be affected in accordance with various known techniques, such as decompression, heating, fall in pressure, vacuum, elution, raising of the front, etc....

Desorption by simply varying the pressure does not give complete satisfaction, especially in the case where the pressure variation is relatively small (a few bars) or when the lower pressure is equal to atmospheric pressure. Reduction to atmospheric pressure does not generally permit the desorption of all the constituent or constituents retained during the adsorption phase.

Neither does desorption by fall in pressure or by applying vacuum permit the complete elimination of the constituents retained in the adsorption mass.

Desorption by elution generally consists in causing the passage through the adsorbent of a part of the enriched mixture produced during the adsorption phase. There is entrainment of the adsorbed gas by dilution in the elution gas. However, this method has the disadvantage of causing a very distinct reduction in the yield of the adsorption phase, in view of the quantities of enriched gas necessary for the elution.

The regeneration by raising of the front consists in raising the pressure in the chamber containing the adsorbent by means of a part of the enriched gas which is obtained, without discharge of gas from the chamber, and in thus carrying the desorbed constituent into the part of the chamber opposite to the inlet of the enriched gas. It can be considered that the raising of the front is comparable to an elution with simultaneous raising of the pressure, without withdrawal of eluent gas.

The present invention has for its object an improved process for regenerating gases, which permits the disadvantages of the known processes to be considerably reduced.

The present invention consists in a process for regenerating an adsorbent mass contained in an adsorption column and used for the substantially isothermal separation of at least two gaseous constituents by a succession of adsorption and desorption operations, in which the regeneration of the mass is effected by desorption of the most adsorbable gaseous constituents, which desorption is effected by elution under constant pressure and pressure drop or exposure to vacuum, this desorption being in addition characterized in that an elution with simultaneous raising of the pressure without withdrawal of eluant gas precedes the said elution under constant pressure and succeeds the said pressure drop or exposure to vacuum.

According to another embodiment of the present invention, the elution is effected with simultaneous raising of the pressure without withdrawal of eluant gas and succeeds a vacuum desorption. The first phase of the procedure corresponds to a raising of the front.

According to one embodiment of the present invention, the elution operations are effected by means of at least a part of the gaseous mixture originating from the reduction to atmospheric pressure or from another adsorption mass, or by means of a part of the purified gaseous mixture which is obtained.

According to another embodiment, the vacuum desorption is continued during the elution succeeding the placing under partial vacuum.

According to one embodiment of the present invention, the elution is compensated for by the suction of the vacuum pump. It is thus possible to maintain a constant pressure in the chamber containing the adsorbent.

According to another embodiment of the present invention, the exposure to vacuum is continued while the elution is interrupted.

According to yet another embodiment of the present invention, as well as the vacuum desorption and the elution under constant pressure, there is an elution step with simultaneous raising of the pressure, without withdrawal of the eluant gas.

The elution under constant pressure preferably succeeds the said elution phase with simultaneous increase in the pressure or raising of the front.

The elution is preferably effected by means of the previously produced enriched gaseous mixture.

According to another embodiment of the present invention, a first part of the elution at least is assured by means of a part of the gaseous mixture originating from another adsorption mass being reduced to atmospheric pressure.

Other objects and advantages of the present invention will be apparent from reading the description and from the accompanying FIGURE, given by way of example.

The drawing represents an adsorption column 1 filled with an adsorbent 2. This adsorbent can be any suitable adsorbent, such as zeolite, infusorial, earth, active carbons, etc..

A valve 3 at the upper end permits the introduction of the gas mixture to be treated. A valve 4 is connected to a vacuum pump (not shown), which ensures that a vacuum of 1 mm. Hg. is maintained in the column 1. A valve 5 permits the reduction to atmospheric pressure.

A valve 6 at the lower end permits the withdrawal of the enriched gas and a valve 7 equipped with a flow limiting device 8, such as a capillary tube, permits the passage of a certain quantity of the enriched gas for the elution or the raising of the front.

A valve 9 can be connected to the pipe by which another column (not shown) can be vented.

Such a column can function as follows, the adsorbent being assumed to be pure or regenerated and, as indicated above, at a pressure of 1 mm. Hg. absolute at the start of the operations: the mixture is introduced to a certain pressure through the valve 3, all the other valves being closed.

When the desired pressure is reached, the valve 6 is opened, while maintaining the valve 3 open and the pressure constant in the column 1. A mixture enriched in its desired constituents is thus recovered.

When a time T elapses from the opening of valve 6, the valve 3 is closed and the withdrawal of the enriched gas is continued by way of the valve 6 until a predetermined pressure is obtained in the column 1.

During the time T, the withdrawal is said to be isobaric, and after the time T, it is said to be "in expansion."

The time T and the pressure on terminating the withdrawal are determined so as to avoid the travel of the front, while assuring a maximum extraction rate of the enriched gas under the test conditions.

At the pressure of termination of the withdrawal, the valve 6 is closed. The pressure in the column 1 is restored to atmospheric pressure by opening the valve 5.

At atmospheric pressure this valve 5 is closed. The column is connected by valve 4 to a vacuum pump (not shown) to reach a pressure of 1 mm. Hg. absolute. The valve 4 is closed while valve 7 is opened until a pressure is reached which is between that vacuum and atmospheric pressure. Then valve 7 is closed and valves 5 and 9 are simultaneously opened.

The checking of the purity of the enriched gas is effected separately on the volume withdrawn during the isobaric period and on the volume withdrawn during the expansion.

The following Examples 1 to 10 relate to different non-limiting embodiments of the regeneration or desorption of the adsorbent.

Examples 1 to 9 are carried out on zeolites having adsorbed the nitrogen of a mixture of 25 percent nitrogen and 75 percent hydrogen. The enriched gas obtained is hydrogen.

EXAMPLES 1 to 9

For the purpose of clarity, the results obtained are set out in the following table, which indicates the nitrogen content in v.p.m. for the volume withdrawn during the isobaric period and for the volume withdrawn during the expansion up to 3 bars absolute.

The method of regeneration and the vacuum which is reached are also indicated in this table.

Example 1 is given by way of comparison.

In Example 9, by "simultaneous elution with vacuum," it has to be understood that pure hydrogen is injected into the column during the application of vacuum, whereas in Examples 5 to 8, by elution, it is understood that the passage of the pure hydrogen is commenced when the vacuum has reached the value indicated.

In Examples 5 to 8, there is a rise in pressure which is variable according to the generated volume of the pump.

In each case, there is in fact observed a surge of pressure, which proves that a complementary degasification of nitrogen occurs, entraining a larger volume at the moment of starting the injection of the pure hydrogen. With the major part of the nitrogen remaining to be desorbed being eliminated, the volume to be pumped then decreases and the pressure is stabilized.

| No of Example | vacuum | Regeneration method | Contents of N$_2$ (vpm) | |
|---|---|---|---|---|
| | | | Isobaric withdrawal | Expansion withdrawal |
| 1 | 1 mm.Hg | without raising of the front and without elution. | 150 | 300 |
| 2 | 1 mm.Hg | + raising of the front in 2 min. | 7.5 | 31.5 |
| 3 | 0.5 mm.Hg | + raising of the front in 2 min. | 2.3 | 6.5 |
| 4 | 0.5 mm.Hg | + raising of the front in 1 min. | 4 | 10.5 |
| 5 | 0.5 mm.Hg | + elution of 1 min (0.83 liter of pure H$_2$/kg zeolite) + raising of the front. | 0.6 | 1.4 |
| 6 | 1 mm.Hg | + elution of 2 min. (1.7 liter of pure H$_2$/Kg zeolite) + raising of the front in 1 min. | 1.1 | 1.3 |
| 7 | 2.5 mm.Hg | + elution of 2 min + raising of the front in 1 min. | 1 | 1.2 |
| 8 | 7.5 mm.Hg | + elution of 2 min + raising of the front in 1 min. | 1 | 1.4 |
| 9 | 10 mm.Hg | simultaneous elution with vacuum (2 min) + raising of the front. | 1.2 | 1.6 |

EXAMPLE 10

This example is carried out on active carbon having adsorbed the CO$_2$ of a mixture formed of H$_2$, CO, CH$_4$ and N$_2$.

The mixture which is obtained purified from CO$_2$, is then passed over a zeolite which adsorbs CH$_4$.

The gaseous phase to be supplied to the atmosphere of the chamber containing the zeolite contains about 60 percent of H$_2$, about 20 percent of N$_2$ and about 20 percent of CO.

This gaseous phase is used for the regeneration of the active carbon. The vacuum of the chamber containing the active carbon is 1 mm and the operation is effected by simultaneous elution with vacuum (6 mm), the elution being commenced at a pressure of 50 mm and the vacuum continuing.

In this way, an excellent and economically interesting regeneration is obtained.

It is obvious that the invention is not limited to the embodiments represented; it is capable of numerous modifications, available to the person skilled in the art, without departing from the scope of the invention.

What I claim is:

1. A method of utilizing and then regenerating an adsorbent mass contained in an adsorption column that is subjected to a succession of alternate adsorption and desorption operations for separating at least one gaseous component from a gaseous mixture, comprising the steps of:
   a. during a said adsorption operation introducing a said gaseous mixture into a first end of the column and withdrawing from a second end of the column gas from which at least one component has been removed by adsorption while maintaining the interior of the column at a first pressure;
   b. discontinuing said introduction and withdrawal of gas, and with the column otherwise closed reducing the pressure in the column to a second pressure substantially below said first pressure;
   c. discontinuing said pressure reduction, and with the column otherwise closed introducing an eluant gas free from said at least one component into said second end of said column until the pressure in the column rises to a third pressure intermediate said first and second pressures; and
   d. thereafter introducing eluant gas free from said at least one component into said second end of said column while withdrawing eluant gas containing desorbate from said first end of the column while maintaining the pressure in the column intermediate said first and second pressures.

2. A process as claimed in claim 1, in which said reduction of pressure comprises a reduction to subatmospheric pressure.

3. A process as claimed in claim 1, at least a portion of said eluant gas comprising a gas withdrawn from said adsorbent mass.

* * * * *